United States Patent [19]

Smalheiser

[11] 3,948,826

[45] Apr. 6, 1976

[54] FLAME RETARDANT POLYURETHANE FOAM

[75] Inventor: Lawrence A. Smalheiser, Spring Valley, N.Y.

[73] Assignee: Stauffer Chemical Company, Westport, Conn.

[22] Filed: Aug. 22, 1974

[21] Appl. No.: 499,666

[52] U.S. Cl.... 260/2.5 AJ; 260/2.5 BE; 260/87.5 R; 260/859 PV
[51] Int. Cl.² .................. C08G 18/14; C08L 75/04; C08F/214/06
[58] Field of Search .260/2.5 AJ, 260/87.5 R, 2.5 BE

[56] References Cited
UNITED STATES PATENTS

| | | | |
|---|---|---|---|
| 3,062,792 | 11/1962 | McConnell et al. | 260/87.5 R |
| 3,544,509 | 12/1970 | Carroll et al. | 260/2.5 AJ |
| 3,574,149 | 4/1971 | Harrington | 260/2.5 AJ |
| 3,792,113 | 2/1974 | Goswami et al. | 260/87.5 R |

*Primary Examiner*—H. S. Cockeram
*Attorney, Agent, or Firm*—Richard P. Fennelly

[57] ABSTRACT

The incorporation of a copolymer of vinyl chloride and a bis(hydrocarbyl) vinylphosphate, e.g., bis(beta-chloroethyl) vinylphosphate, in a polyurethane foam formulation confers flame retardancy on the foam and lessens discoloration that occurs when the foam is formed.

20 Claims, No Drawings

FLAME RETARDANT POLYURETHANE FOAM

TECHNICAL DESCRIPTION OF THE INVENTION

A variety of materials have been used as additives in polyurethane foam formulations to confer flame retardancy on the foam produced therefrom. One such material is polyvinyl chloride. Incorporation of polyvinyl chloride in a foam formulation, however, often results in a dark discoloration of the foam during foam formulation. The present invention is concerned with preventing this problem from occurring when polyvinyl chloride is used as a flame retardant.

The present invention comprises the incorporation of about 10 to 70 parts by weight, per hundred parts of polyol, of a polyvinyl chloride-bis(hydrocarbyl) vinylphosphonate, as described in greater detail below, in a polyurethane foam formulation. The art is well aware of numerous methods for formulating foamed polyurethane. Two publications which describe such methods are the Kirk-Othmer Encyclopedia of Chemical Technology, 2nd Edition, Vol. 9, pp. 853–855 and Saunders and Frish, Polyurethanes: Chemistry and Technology, New york, N.Y., and these publications are incorporated herein by reference. The present invention is directed to the well-known one shot, prepolymer and semi-prepolymer techniques. The term "polyurethane foam formulation" as used herein is intended to cover the one-shot foam formulation as well as the prepolymer and semi-prepolymer formulations. If the one-shot technique is used the flame retardant copolymer can be placed in one of the components of the foam formulation, e.g., in the polyol or in the toluene diisocyanate-stannous octoate mixture. When using either the one-shot, the prepolymer or the semiprepolymer approaches, the amount of copolymer which is added to one of the components of the formulation ranges between about 10 and 70 parts per hundred parts by weight of polyol in the foam formulation. The amount of copolymer in the foam produced therefrom varies between about 10 to 25% by weight of the foam. The ratio of polyvinyl chloride and bis(hydrocarbyl)vinylphosphonate which is used in the copolymer should range between about 95–60% and about 5–40%, respectively.

The type of vinylphosphonate contemplated for use herein has the following formula:

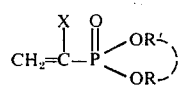

wherein X is selected from the group consisting of hydrogen, halogen, cyano, aryl, haloaryl, $C_1$–$C_{18}$ alkyl, $C_1$–$C_{18}$ haloalkyl and

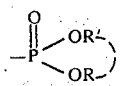

wherein R and R' are hydrocarbyl and substituted hydrocarbyl groups consisting essentially of hydrogen and carbon and containing up to about 18 carbon atoms, inclusive, with the proviso that R and R' may be the same, different or conjoint. The use in this disclosure of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester, keto groups and the like.

Illustrative of such aliphatic groups as are represented by R and R' are alkyl groups, such as methyl, ethyl, propyl, butyl, pentyl, hexyl, nonyl, pentenyl, hexenyl groups and all of their respective isomers; cycloalkyl and cycloalkenyl groups, such as cyclopropyl, cyclobutyl, cyclopentyl, cyclohexyl, cyclohexenyl groups, and the like; while typical aryl groups represented by R and R' include phenyl, benzyl, phenethyl, tolyl, naphthyl groups, and the like.

Representative of the above-depicted bis(hydrocarbyl) vinylphosphonates are:
Bis(beta-chloroethyl) vinylphosphonate (the preferred compound for use in the present invention);
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

If desired, the copolymer of polyvinyl chloride and the selected vinylphosphonate may also contain up to about 25% of its weight of one or more optional copolymers containing ethylenic unsaturation and which copolymerizes well with the vinyl chloride and vinylphosphonate monomers. Representative monomers which copolymerize well with vinyl chloride monomer and the vinylphosphonate monomer are the vinyl halides, such as vinyl bromide, and vinyl fluoride; the vinylidene halides, such as vinylidene chloride, bromide, and fluoride, and vinylidene chloride bromide; the alpha-olefins, such as ethylene, propylene and butylene; the vinyl esters of carboxylic acids, such as vinyl acetate, vinyl butyrate, and vinyl stearate; the $C_1$–$C_{20}$ alkyl esters of acrylic and methacrylic acid, such as methyl methacrylate, methyl acrylate, ethyl acrylate, butyl acrylate, 2-ethylhexyl acrylate and lauryl acrylate; the aryl, halo- and nitro-substituted benzyl esters of acrylic and methacrylic acid, such as benzyl acrylate and 2-chlorobenzyl acrylate; the dialkyl $C_1$–$C_{12}$, fumarates and maleates; the amides of ethylenically unsaturated carboxylic acids, such as acrylamide and methacrylamide; vinyl aryl compounds, such as styrene and alpha-methyl styrene; nitriles of ethylenically unsaturated carboxylic acids, such as acrylonitrile and methacrylonitrile; and the $C_1$–$C_{20}$ alkyl vinyl ethers, such as methyl vinyl ether, ethyl vinyl ether and stearyl vinyl ether.

The vinyl chloride monomer and selected vinylphosphonate either with or without optional comonomers are copolymerized by means of suspension or emulsion polymerization processes, the general details of which are well known to one skilled in the art.

The suspension polymerization, in general, can be conducted in an aqueous medium containing from about 0.01 to 5%, as based on the total weight of the monomer mixture, of a suspension agent such as for example, gelatin, starch, hydroxymethyl cellulose, hydroxyethyl cellulose, hydroxypropyl cellulose, carboxymethyl cellulose, talc, clay, polyvinyl alcohol, and the like. As a catalyst for the polymerization, one may use from about 0.01 to 5%, as based on the total weight of the monomer mixture, of a monomer soluble azo or peroxide compound such as, for example, azobisisobutyronitrile, lauroyl peroxide, benzoyl peroxide, isopropyl peroxydicarbonate, t-butyl peroxypivalate and the like. Polymerization may ordinarily be initiated by heating the system to a temperature in the range of from about 10° to 100°C. for a period of from about 1 to 30 hours with agitation being applied throughout the course of the reaction. The resulting product will comprise an aqueous suspension of the desired copolymers which will be in the form of particulate solids having a resin solids content in the range of from about 5 to 60%, by weight. These copolymer or interpolymer particles will have a particle size in the range of from about 2 to 500 microns with a range of from about 50 to 250 microns being preferred.

When emulsion polymerization procedures are used, an aqueous emulsion monomer charge containing about 10 to 50%, by weight of the monomers described above is formed. The emulsion batch contains from about 0.2 to 5.0% by weight of one or more of the well known emulsifying agents and from about 0.05 to 5% by weight of a water-soluble catalyst. The reaction mixture is heated to a temperature of about 40° to 95°C. for a period of about 0.5 to 8 hours. Examples of suitable emulsifiers include the alkyl carboxylic acid salts; the alkyl sulfate, sulfonate, phosphate, or sulfosuccinate salts; the alkyl aryl ether alcohols, and the alkyl aryl polyether sulfate salts. Some suitable catalysts include sodium, potassium and ammonium persulfate and hydrogen peroxide, or a redox system, e.g., a mixture of a persulfate with an alkali metal bisulfite, thiosulfate or hydrosulfite. The copolymer particles have a diameter which ranges in size from about 0.03 to 3.0 microns.

When the copolymers are obtained they are then incorporated into a polyurethane foam formulation as that term is defined above.

When the one-shot technique is used, an organic polyisocyanate is reacted with a polyol. U.S. Pat. No. Re. 27,887 lists a large number of polyisocyanates and polyols which can be used and is incorporated herein by reference. A preferred polyisocyanate is toluene diisocyanate. The polyols can have a hydroxyl number ranging between 20 and 800. The preferred class are the hydroxy-terminated polyester and polyether polyols, e.g., the alkylene oxide adducts of polyhydric alcohols. The amount of isocyanate equivalents to hydrogen equivalents is usually about 1 to 1.1. Small amounts of water or a suitable blowing agent can be employed to promote foaming. U.S. Pat. No. Re. 27,887 also lists a wide variety of blowing agents that can be used. The preferred blowing agents are the halogen substituted aliphatic hydrocarbons which have a boiling point of between 40° and 70°C. A catalyst, e.g., a tertiary amine, can be used to accelerate the reaction.

If desired the prepolymer process can be used. In this process the polyol is reacted with enough polyisocyanate to result in a prepolymer having isocyanate end groups plus excess isocyanate. The prepolymer is then reacted with water to simultaneously release carbon dioxide for expansion and link the chains together. This method is often used for flexible foams.

If the semi-prepolymer process is used, a prepolymer containing excess isocyanate is mixed with more polyol and a separate blowing agent. The prepolymer can contain only a few percent of the total polyol. This method is particularly useful for producing rigid foams.

If desired the foam formulation can also contain additional conventional flame retardants, e.g., antimony trioxide, in conventionally known amounts to enhance the flame retardancy of the foam.

The invention is further illustrated by the following Examples:

EXAMPLE I

A suspension polymerization charge was formed by mixing together the following reagents:

| REAGENT | AMOUNT |
|---|---|
| Vinyl chloride monomer | 1900 g. |
| Distilled water | 4100 g. |
| Methocell SA 1242 (1% solution)-hydroxypropyl methyl cellulose | 300 g. |
| Bis(beta-chloroethyl) vinylphosphonate | 100 g. |
| An azobisisobutyronitrile initiator | 3.5 g. |

The polymerization reaction was run at 60°C. for about 5½ hours and yielded about 1500 grams of a 95/5 vinyl chloride/bis(beta-chloroethyl)vinylphosphonate copolymer having a relative viscosity of about 1.98.

EXAMPLE II

A series of polyurethane foam formulations were made to test the flame retardancy of polyvinyl chloride and polyvinyl chloride - bis(beta chloroethyl) vinylphosphonate. The Tables below set forth the results:

TABLE I

| INGREDIENT | AMOUNT |
|---|---|
| Flame Retardant* | 45 g |
| Voranol CP-3000 Polyol | 200 g |
| Silicone Surfactant-L520 | 3 g |
| Water | 7.2 cc |
| Niax A-1 amine catalyst | 0.23 cc |
| Dabco 33LV | 0.63 cc |
| $Cl_3CF$ blowing agent | 6.0 g |
| Dimethyl formamide | 6.0 g |
| Stannous Octoate T-10 50% in dioctyl phthalate | 1.68 cc |
| Toluene diisocyanate (2,4 isomer 80% - 2,6 isomer - 20%) | 91.6 g |

*Table II below sets forth the type of flame retardant, when present. The general procedure used in Example I can be used to form the polyvinyl chloride - bis(beta-chloroethyl) vinylphosphonate copolymers.

The toluene diisocyanate and stannous octoate were added together to the remainder of the ingredients and were stirred vigorously for about 30 seconds. The entire reaction mixture was then transferred to a suitably large container for foam expansion. After aging for one day, the foam was cut into 2 inch × 6 inch × ½ inch samples for testing.

TABLE II

The basic recipe set forth in Table I was utilized with the following flame retardants:

| Foam No. | Flame Retardant* | Foam Density (lbs./ft³) | Color of Foam** | Flame Test (in/min) |
|---|---|---|---|---|
| 1 | NONE | 1.75 | white | 4.6 |
| 2 | NONE | 1.70 | white | 5.2 |
| 3 | Polyvinyl chloride | 1.84 | red purple | 3.0 |
| 4 | 95/5 PVC/BB*** | 1.81 | blue purple | 2.1 |
| 5 | 70/30 PVC/BB**** | 1.79 | light tan | 2.6 |

*ratios are on a weight basis; PVC = polyvinyl chloride; BB=bis(beta chloroethyl) vinylphosphonate. All flame retardants are present at 10 parts per hundred based on the weight of polyol as 100.
**after aging, prior to testing flame retardancy.
***formed by the procedure of Example I.
****formed by the procedure of Example 1 with adjustments made in the amount of vinyl chloride and bis(beta-chloroethyl) vinylphosphonate.

What is claimed:

1. A method for forming a flame retardant polyurethane foam from a polyurethane foam formulation which comprises incorporating in said formulation an effective amount for flame retardancy and lessened discoloration of a copolymer of:

a. a bis(hydrocarbyl) vinylphosphonate having the formula

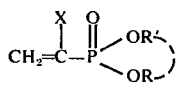

wherein X is selected from the group consisting of hydrogen, halogen, cyano, aryl, haloaryl, $C_1$–$C_{18}$ alkyl, $C_1$–$C_{18}$ halo-alkyl and

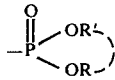

wherein R and R' are hydrocarbyl and substituted hydrocarbyl groups consisting essentially of hydrogen and carbon and containing up to about 18 carbon atoms, inclusive with the proviso that R and R' may be the same, different or conjoint; and b. vinyl chloride.

2. A method as claimed in claim 1 wherein the amount of copolymer which is incorporated in the foam formulation varies between 10 and 70 parts by weight per hundred parts by weight of polyol in the foam formulation.

3. A method as claimed in claim 1 wherein the vinylphosphonate is bis(beta-chloroethyl) vinylphosphonate.

4. A method as claimed in claim 1 wherein the amount of bis(hydrocarbyl) vinylphosphonate in the copolymer ranges between about 5 and 40% by weight of the copolymer.

5. A method as claimed in claim 1 wherein the amount of vinyl chloride in the copolymer ranges between about 60 and 95% by weight of the copolymer.

6. A method as claimed in claim 1 wherein the copolymer is an emulsion copolymer.

7. A method as claimed in claim 1 wherein the copolymer is a suspension copolymer.

8. A method as claimed in claim 1 which further comprises incorporation of an additional flame retardant in the foam formulation.

9. A method as claimed in claim 8 wherein the additional flame retardant is antimony oxide.

10. A method as claimed in claim 1 wherein the copolymer further comprises an additional comonomer copolymerizable therewith in an amount which ranges up to about 25% of its weight.

11. A polyurethane foam which comprises an effective amount for flame retardancy and lessened discoloration of a copolymer of:

a. a bis(hydrocarbyl) vinylphosphonate having the formula

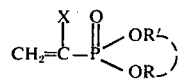

wherein X is selected from the group consisting of hydrogen, halogen, cyano, aryl, haloaryl, $C_1$–$C_{18}$ alkyl, $C_1$–$C_{18}$ halo-alkyl and

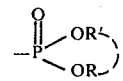

where R and R' are hydrocarbyl and substituted hydrocarbyl groups consisting essentially of hydrogen and carbon and containing up to about 18 carbon atoms, inclusive with the proviso that R and R' may be the same, different or conjoint; and b. vinyl chloride.

12. A foam as claimed in claim 11 wherein the amount of copolymer which is in the foam varies between about 10 and 25% by weight of the foam.

13. A foam as claimed in claim 11 wherein the vinylphosphonate is bis(beta-chloroethyl) vinylphosphonate.

14. A foam as claimed in claim 11 wherein the amount of bis(hydrocarbyl) vinylphosphonate in the copolymer ranges between about 5 and 40% by weight of the copolymer.

15. A foam as claimed in claim 11 wherein the amount of vinyl chloride in the copolymer ranges between about 60 and 95% by weight of the copolymer.

16. A foam as claimed in claim 11 wherein the copolymer is an emulsion copolymer.

17. A foam as claimed in claim 11 wherein the copolymer is a suspension copolymer.

18. A foam as claimed in claim 11 which further comprises an additional flame retardant.

19. A foam as claimed in claim 18 wherein the additional flame retardant is antimony oxide.

20. A foam as claimed in claim 11 wherein the copolymer further comprises an additional comonomer copolymerizable therewith in an amount which ranges up to about 25% of its weight.

* * * * *